POLYCARBOXYLATES

Joachim Dazzi, Dayton, Ohio, assignor to Monsanto Chemical Company, St. Louis, Mo., a corporation of Delaware No Drawing. Application July 16, 1952,
Serial No. 299,240

3 Claims. (Cl. 260—404.8)

The present invention relates to adducts and more particularly provides new polycarboxylates, methods of preparing such carboxylates by the addition reaction of certain fumarates with certain esters of higher olefinic acids, and vinyl chloride polymers plasticized with the new polycarboxylates.

According to the invention there are provided addition products having the formula:

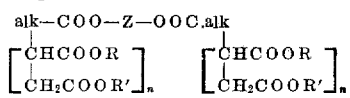

in which alk denotes an alkenyl radical of from 9 to 23 carbon atoms, Z is selected from the class consisting of alkylene radicals of from 2 to 4 carbon atoms, alkyleneoxyalkylene radicals of from 4 to 6 carbon atoms and polyalkyleneoxyalkylene radicals of from 6 to 9 carbon atoms, R and R' are selected from the class consisting of alkyl radicals of from 1 to 6 carbon atoms and alkoxyalkyl radicals of from 3 to 8 carbon atoms and $n$ is an integer of from 1 to 3.

Compounds having the above formula are readily prepared by the addition reaction of a dialkyl or of a bis-(alkoxyalkyl) fumarate of from 6 to 20 carbon atoms with a diester of an aliphatic, mono-olefinic, fatty acid of from 10 to 24 carbon atoms and a hydroxy compound having the formula HOZOH in which Z is as defined above.

Dialkyl or bis-(alkoxyalkyl) fumarates which may be condensed with the higher olefinic diesters to yield the present products include, e. g., the simple dialkyl fumarates such as dimethyl, diethyl, di-n-propyl, diisobutyl, di-n-amyl, or di-n-hexyl fumarate; the mixed dialkyl fumarates such as ethyl isopropyl fumarate, methyl n-amyl fumarate or n-butyl isohexyl fumarate; the simple bis-(alkoxyalkyl) fumarates such as bis-(2-methoxyethyl) fumarate, bis-(2-ethoxyethyl) fumarate or bis-(4-ethoxybutyl) fumarate; the mixed alkoxyalkyl fumarates such as 2-ethoxyethyl 3-methoxypropyl fumarate or the mixed alkoxyalkyl alkyl fumarates such as 2-butoxyethyl n-butyl fumarate.

As examples of esters of higher mono-olefinic mono-carboxylic acids which are useful for the present purpose may be mentioned the di-1-decenoates, the di-10-undecylenates, the di-1-dodecenoates, the dioleates, the dielaidates, or the dierucates of such glycols or polyglycols as diethylene glycol, ethylene glycol, propylene glycol, triethylene glycol, 1,4-butanediol, tripropylene glycol, etc. The useful diesters are readily available compounds which are easily prepared in known manner, e. g., by reaction of the higher mono-olefinic, fatty acid, e. g., undecylenic acid or oleic acid or technical mixtures containing such acids with an alkylene glycol such as ethylene glycol or butylene glycol or with a polyalkylene glycol such as diethylene or dipropylene glycol.

Reaction of the glycol diesters with the fumarate is effected simply by heating a mixture of the two reactants at temperatures of from, say, 100° C. to 300° C., depending upon the nature of the individual reactants and of the properties desired in the final product. The reaction is generally effected at atmospheric pressure, but pressures below atmospheric or above atmospheric may be used. Condensation catalysts may be employed. The reaction results in the addition of from 1 to 3 moles of the fumarate at each acid portion of the long chained diester. Thus the reaction of a simple dialkyl fumarate such as dimethyl fumarate with a diester of ethylene glycol such as ethylene glycol oleate can yield products in which from 2 to 6 moles of the fumarate have reacted with the oleate, depending upon the reaction time and the proportion of reactants used.

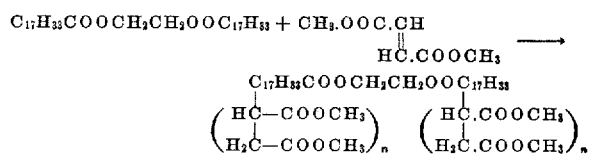

in which $n$ is an integer of from 1 to 3.

Instead of employing dialkyl fumarates, bis-(alkoxyalkyl) fumarates or the mixed alkoxyalkyl alkyl fumarates may be employed to give the same type of addition products.

The present polycarboxylates are stable, high-boiling, clear and substantially colorless products which range from viscous liquids to semi-solid or solid masses. They may be advantageously employed for a variety of industrial purposes, e. g., as lubricant additives, as intermediates for the production of surface active agents, etc. They are particularly valuable as plasticizers for vinyl chloride polymers, the present esters serving not only to soften vinyl chloride polymers, but also to impart simultaneously a high degree of low temperature flexibility, very good temperature stability and great mechanical strength to these polymers. They are compatible with vinyl chloride polymers and show no exudation of plasticizer even at plasticizer content of up to 50 per cent. Although the quantity of plasticizer will depend upon the particular polymer to be plasticized and upon its molecular weight, it is generally found that compositions having from 5 per cent to 50 per cent by weight of plasticizer will, in most cases, be satisfactory for general utility. The good flexibility of the plasticized compositions increases with increasing plasticizer concentration.

The present esters are valuable plasticizers for polyvinyl chloride and copolymers of at least 70 per cent by weight of vinyl chloride and up to 30 per cent by weight of an unsaturated monomer copolymerizable therewith, for example, vinyl acetate, vinylidene chloride, etc.

In evaluating plasticizer efficiency use is made of the following empirical testing procedures:

*Compatibility.*—Visual inspection of the plasticized composition is employed, incompatibility of the plasticizer with the polymer being demonstrated by cloudiness and exudation of the plasticizer.

*Hardness.*—A standard instrument made by the Shore Instrument Company is used for this determination and expresses the hardness in units from 1 to 100. The hardness of a composition is judged by its resistance to the penetration of a standard needle applied to the composition under a standard load for a standard length of time.

*Low temperature flexibility.*—Low temperature flexibility is one of the most important properties of elastomeric vinyl compositions. While many plasticizers will produce flexible compositions at room temperature, the flexibility of these compositions at low temperatures may vary considerably, i. e., plasticized polyvinyl chloride compositions that are flexible at room temperatures often become very brittle and useless at low temperatures. Low temperature flexibility tests herein employed are according to the Clash-Berg method. This method determines the torsional flexibility of a plastic at various temperatures. The temperature at which the vinyl composition exhibits an arbitrarily established minimum flexibility is defined as the low temperature flexibility of the composition. This valve may also be defined as the lower temperature limit of the plasticized composition's usefulness as an elastomer.

*Volatility.*—Just as a decrease in temperature often results in decreased flexibility of a plasticized polymer composition so does a decrease in plasticizer concentration when caused by volatilization of the plasticizer. Hence, plasticizers which are readily volatilized from the plasticized composition as a result of aging or heating are inefficient because upon volatilization the plasticized composition becomes stiff and hard. The test for plasticizer volatility herein employed is that described by the American Society for Testing Materials under the designation D-744-44T.

*Water resistance.*—The amount of water absorption and the amount of leaching that takes place when the plasticized composition is immersed in distilled water for 24 hours is determined.

The invention is further illustrated, but not limited, by the following examples:

Example 1

Reaction of 1,2-propylene glycol dioleate with diethyl fumarate was effected as follows:

A mixture consisting of 90.7 g. (0.135 mole) of the dioleate and 129.3 g. (0.75 mole) of the fumarate was refluxed in a nitrogen atmosphere for about 4 hours at a temperature of from 225° C. to 270° C. The resulting reaction mixture was then maintained at 250° C./2 mm. for 40 minutes in order to remove any unreacted diethyl fumarate and other low boiling materials. Treatment of the residue with 1.5 g. clay and a filter aid at 120–135° C. for 1.5 hours gave 164.1 g. of addition product, $n_D^{25}$ 1.4270, in which an average of 2.83 moles of diethyl fumarate had added to one mole of the propylene glycol dioleate, as determined by measuring the quantity of diethyl fumarate recovered. The adduct is thus probably a mixture of compounds in which from 1–3 moles of the fumarate are combined with 1 mole of the oleate.

Example 2

In another experiment in which the same reactants were used in the same quantities, but heating was conducted for only three hours at a temperature of 224–252° C., there was obtained 134 g. of an adduct, $n_D^{25}$ 1.4674, in which one mole of the dioleate was combined with an average of 1.68 moles of the diethyl fumarate.

Example 3

Diethyl fumarate was reacted with diethylene glycol dioleate as follows:

A charge consisting of 95.5 g. (0.15 mole) of the dioleate and 129.3 g. (0.75 mole) of diethyl fumarate was refluxed for 4.5 hours at a temperature of 215–239° C. Material boiling up to 250°/2 mm. pressure (probably unreacted diethyl fumarate) was removed to yield as residue 147.3 g. of the semi-solid adduct, $n_D^{25}$ 1.4680, of the diethylene glycol dioleate and an average of 2.03 moles of diethyl fumarate, as determined by measuring unreacted diethyl fumarate.

Example 4

Sixty parts of polyvinyl chloride and forty parts by weight of the diethyl fumarate-propylene glycol dioleate addition product of Example 1 were mixed on a rolling mill to a homogeneous blend. During the milling there was observed substantially no fuming and discoloration. A molded sheet of the mixture was clear, transparent, and substantially colorless. Testing of the molded sheet for low temperature flexibility, according to the testing procedure described above, gave a value of minus 13.9° C., which value denotes good low temperature properties. Tests on the volatility characteristics of the plasticized composition gave a value of 0.71 per cent which showed excellent retention of plasticizer and indicated good temperature characteristics of the composition. The plasticized material had a hardness of 86, and a solids loss value of 0.061 per cent. When subjected to heat at a temperature of 325° F. for a period of 30 minutes the clarity and color of the molded sheet were substantially unchanged.

Example 5

Operating as in Example 4, but employing the product of Example 3 instead of that of Example 1, there was obtained a plasticized polyvinyl chloride composition having the low temperature flexibility value of minus 40° C. Tests on the volatility characteristics of the plasticized composition gave a value of 4.65 per cent. The plasticized material had a hardness of 92. When subjected to heat as in Example 4, the color of the present molded product was substantially unchanged. Tests on water-resistance of the plasticized material, employing the test procedure described above, showed a solids loss of 0.24 per cent.

Instead of the esters employed in the examples above, other reaction products of dialkyl or bis-(alkoxyalkyl) fumarates and alkylene glycol oleates, undecylenates or dodecenoates, may be employed to yield similarly valuable plasticized products.

While the above examples show only compositions in which the ratio of plasticizer to polymer content is 40:60, this ratio being employed in order to get comparable efficiencies, the content of ester to polyvinyl chloride may be widely varied, depending upon the properties desired in the final product. For many purposes a plasticizer content of, say, from only 10 per cent to 20 per cent is preferred. The present esters are compatible with polyvinyl chloride over wide ranges of concentrations, up to 50 per cent of esters based on the total weight of the plasticized composition yielding desirable products.

Although the invention has been described particularly with reference to the use of the present esters as plasticizers for polyvinyl chloride, these esters are advantageously employed also as plasticizers for copolymers of vinyl chloride, for example, the copolymers of vinyl chloride with vinyl acetate or vinylidene chloride, etc. Preferably such copolymers have a high vinyl chloride content, i. e., a vinyl chloride content of at least 70 per cent by weight of vinyl chloride and up to 30 per cent by weight of the copolymerizable monomer.

The plasticized polyvinyl halide compositions of the present invention have good thermal stability; however, for many purposes it may be advantageous to use known stabilizers in the plasticized compositions. Inasmuch as the present esters are substantially unreactive with the commercially available heat and light stabilizers which are commonly employed with polyvinyl chloride or copolymers thereof, the presence of such materials in the plasticized compositions does not impair the valuable properties of the present esters. The present esters are of general utility in softening vinyl chloride polymers. They may be used as the only plasticizing component in a compounded vinyl chloride polymer or they may be used in conjunction with other plasticizers.

What I claim is:

1. Polycarboxylates having the formula

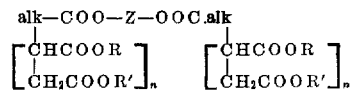

in which alk denotes an alkenyl radical of from 9 to 23 carbon atoms, Z is selected from the class consisting of alkylene radicals of from 2 to 4 carbon atoms and alkyleneoxyalkylene radicals of from 4 to 6 carbon atoms, R and R' are selected from the class consisting of alkyl radicals of from 1 to 6 carbon atoms and alkoxyalkyl radicals of from 3 to 8 carbon atoms and $n$ is an integer of from 1 to 3.

2. A polycarboxylate having the formula

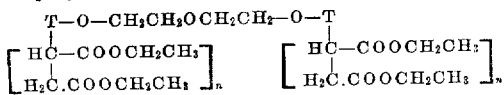

in which T is the oleyl radical and $n$ is an integer of from 1 to 3.

3. A polycarboxylate having the formula

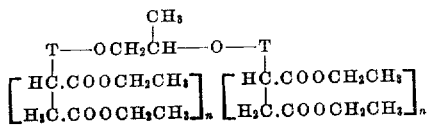

in which T is an oleyl radical and $n$ is the integer of from 1 to 3.

References Cited in the file of this patent

UNITED STATES PATENTS

| | | |
|---|---|---|
| 2,188,885 | Clocker | Jan. 30, 1940 |
| 2,443,284 | Waldie | June 15, 1948 |
| 2,444,328 | Blair | June 29, 1948 |
| 2,467,912 | Rust | Apr. 19, 1949 |
| 2,563,312 | Dazzi | Aug. 7, 1951 |
| 2,587,411 | Ullmann et al. | Feb. 26, 1952 |
| 2,598,636 | Dazzi | May 27, 1952 |
| 2,687,421 | Butler | Aug. 24, 1954 |

UNITED STATES PATENT OFFICE
Certificate of Correction

Patent No. 2,757,188                                         July 31, 1956

Joachim Dazzi

It is hereby certified that error appears in the printed specification of the above numbered patent requiring correction and that the said Letters Patent should read as corrected below.

Column 2, lines 16 to 23 inclusive, strike out

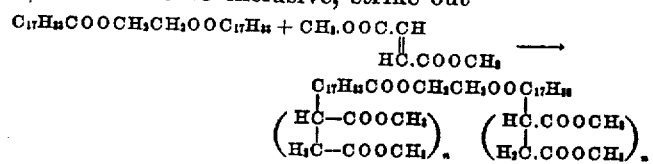

in which $n$ is an integer of from 1 to 3.

Signed and sealed this 24th day of June 1958.

[SEAL]

Attest:
KARL H. AXLINE,
*Attesting Officer.*

ROBERT C. WATSON,
*Commissioner of Patents.*